United States Patent Office 2,889,868
Patented June 9, 1959

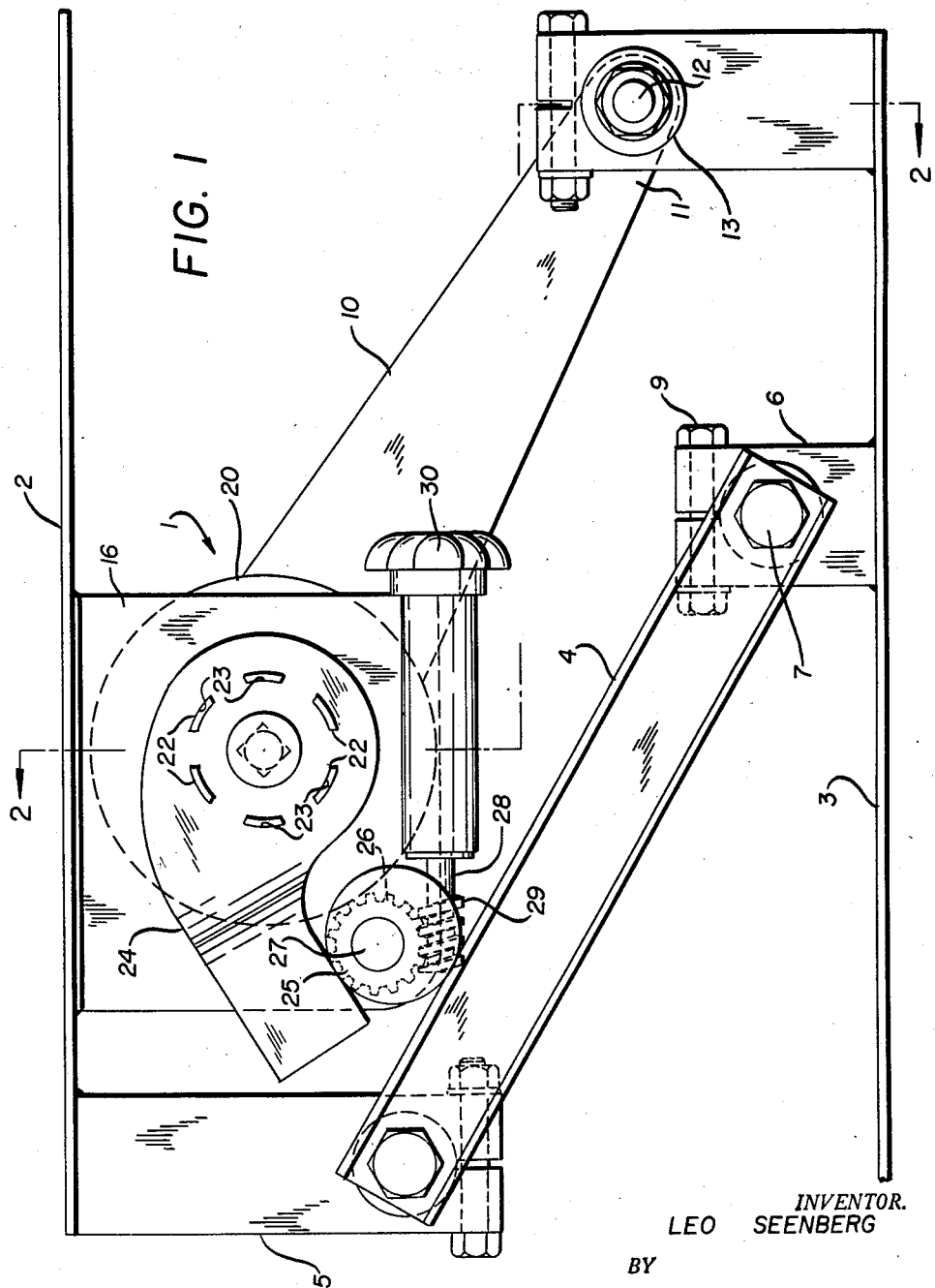

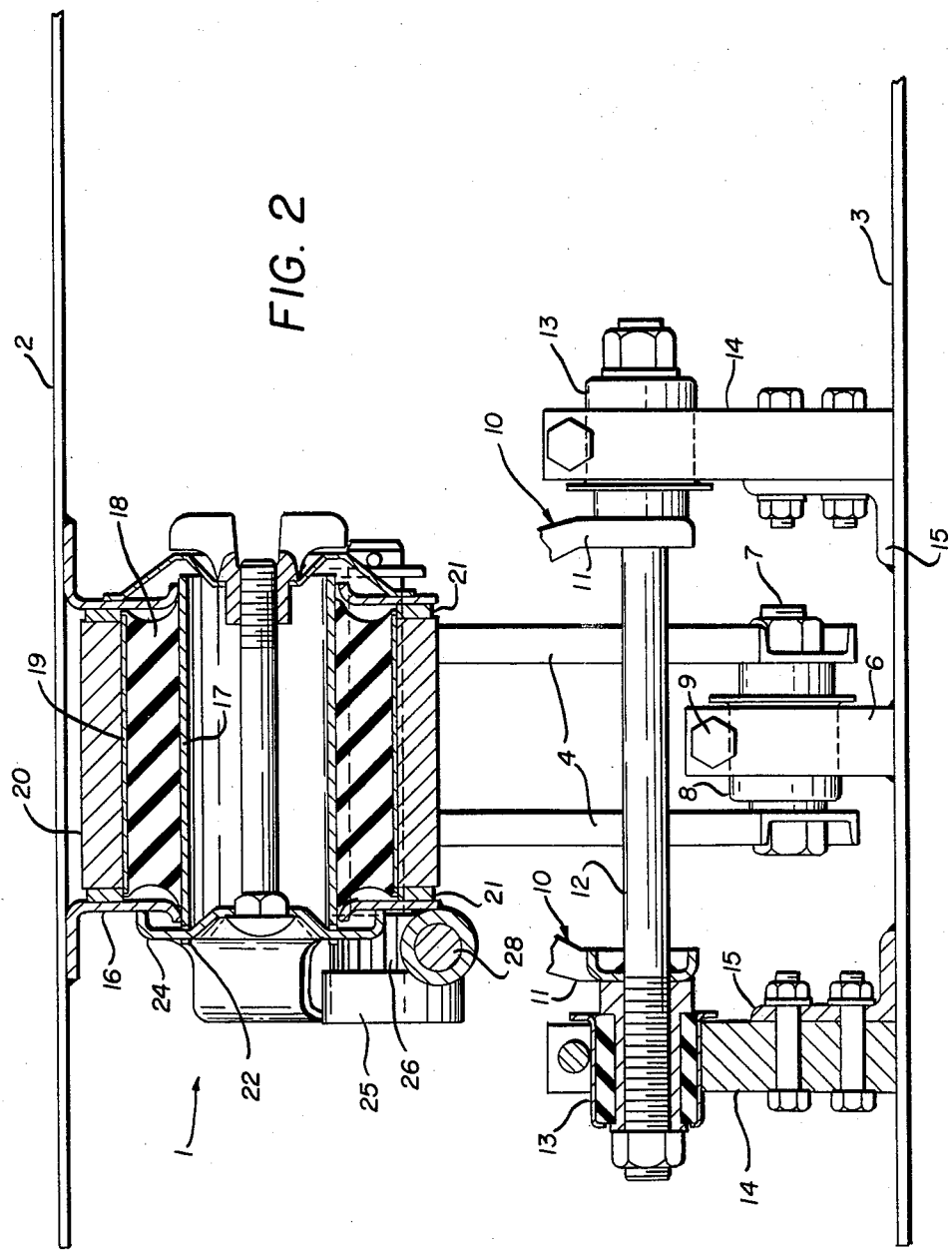

2,889,868

TORSION TYPE SEAT SUPPORT

Leo Seenberg, Akron, Ohio

Application December 28, 1954, Serial No. 478,055

5 Claims. (Cl. 155—50)

This invention relates to seat supports, and especially to seat supports using rubber torsion bushings therein, and wherein variable position and load support characteristics are desired in the seat.

Heretofore there have been various types of constructions provided for seat supports and most vehicle type seat supports have been adjustable only longitudinally of the vehicle in which they are positioned. Some attempts have been made heretofore to provide a vertical adjustment in a seat support and in some instances such vertically adjustable seats may have had different operating characteristics under various adjusted positions thereof. In all events, no completely satisfactory type of a vertically adjustable seat support has heretofore been made and no inexpensive but sturdily constructed seat support has been provided whereby the load supporting characteristics of the seat may be varied at different vertical positions thereof.

The general object of the present invention is to provide a novel and improved type of a seat support having vertical adjustment and where the load support characteristics of the seat support can be varied.

Another object of the invention is to use a parallelogram type of a seat support wherein a rubber torsion bushing is provided and its supporting action can be controlled to change the load support action of the seat.

A further object of the invention is to provide a seat support wherein the seat can be readily adjusted by an individual riding on the seat to a convenient position and to desired load supporting characteristics.

Yet another object of the invention is to provide a sturdy type of a seat support for use in a vehicle wherein the seat support is adapted to have a long service life with a minimum of maintenance thereon.

The foregoing and other objects and advantages of the invention will be made more apparent as the invention proceeds.

For a better understanding of the invention, reference should be had to the drawings, wherein:

Fig. 1 is a side elevation of a seat support embodying the principles of the invention; and Fig. 2 is a fragmentary vertical section through the seat support of Fig. 1.

When referring to corresponding parts shown in the drawings and referred to in the specification, corresponding numerals are used to facilitate comparison between such similar parts.

The present invention relates to a seat support comprising a seat member, a plurality of vertically movable support arms for the seat member, means pivotally anchoring corresponding lower ends of the support arms, means pivotally secured to the other ends of the support arms to engage them with the seat member, the last named means having a primary load support member including a rubber torsion bushing, and cam and lever means for changing the no-load forces set up in the rubber torsion bushings for changing the vertical position of the seat member and for changing the load support characteristics of the seat support.

Attention now should be made to the details of the structure shown in the accompanying drawings, and a seat support is indicated as a whole by the numeral 1. This seat support includes some type of a seat, or seat support 2 and usually some conventional type of base plate or frame means 3, which comprise the supporting structure in the apparatus. Suitable cushion means may be carried by the seat 2. The seat support 1 of the invention is adapted to position the seat 2 in adjustable vertical relation to the base 3, while it also is possible to change the supporting characteristics of the seat support 1, as hereinafter described in more detail.

The seat 2 is positioned by means of a pair of support arms 4 that are conventionally and suitably pivotally secured to the seat 2 through one or more brackets 5 secured to and extending downwardly from the seat 2. The lower ends of the support arms 4 are secured in laterally spaced positions to a support bracket 6 that is in turn secured, as by welding, to the base 3.

The lower ends of the support arms 4 are shown in journalled engagement with a support bolt or shaft 7 extending transversely of the seat support 1 and wherein such bolt 7 is secured to the support bracket by a resilient torsion bushing 8 of a conventional construction. The bushing 8 is held in a split upper end of the support bracket 6 by a bolt 9. It thus will be seen that the pair of support arms 4 are resiliently positioned on bracket 6 for pivotal movement. These support arms 4 are adapted to move in and define a vertical plane to vary the vertical position of the seat 2 with relation to the base 3. A pair of front support arms 10 are provided for the seat 2 and they have lower ends 11 journalled on a shaft 12. The shaft 12 preferably is positioned by conventional rubber bushings 13 in spaced housings 14 secured to the base 3 by brackets 15 and associated means.

An important feature of the present invention relates to the means used to engage or secure the upper ends of the front arms 10 to the seat 2. Such means include brackets 16 secured to the lower surface of the seat 2 and extending downwardly therefrom. The brackets 16 accurately position and journal an inner sleeve 17 of a rubber torsion bushing 18 therein. This rubber torsion bushing 18 is of conventional construction and has an outer sleeve 19 with both the inner and outer sleeves 17 and 19, respectively, being made from metal and being vulcanized to the rubber or rubber-like material forming the resilient connecting means in the torsion bushing 18. The front arms 10 are secured to the outer sleeve 19 of the bushing 18 in any desired manner, such as by having such arms 10 welded or otherwise secured to a sleeve 20 that is in encompassing engagement with the outer sleeve 19 and suitably secured thereto, as by a key extending between such adjacent sleeves.

It should be noted that the outer sleeve 19 also is positioned between the brackets 16 for arcuate movement with relation to the inner sleeve 17. Spacer rings 21 are positioned intermediate the outer sleeve 20 and the adjacent portions of the brackets 16 to aid in positioning the different components of the torsion rubber bushing 18 for relative arcuate movement. The outer sleeve 20 is held in against movement by the primary load support arms 4 as it is secured to such support arms 4 through the auxiliary sleeve 20, which is engaged with the outer torsion sleeve 19 and moves as a unit therewith. However, upon downward movement of the seat frame 2, the sleeve 20 and outer sleeve 19 of the torsion bushing 18 will move arcuately slightly with relation to the fixed brackets 16 and the inner sleeve 17 of the torsion bushing which is held fixedly in any given or adjusted position. Fig. 2 of the drawings best shows that the inner sleeve 17 of the bushing extends axially outwardly from one bracket 16 and has fingers 22 extending therefrom. These fingers 22 extend through slots, or openings 23 provided in a lever arm 24. The lever arm 24 extends substantially radially from the torsion rubber bushing 18 and is in fixed engagement with the inner sleeve 17 thereof for controlling the no-load forces in the torsion bushing. Arcuate movement of the lever arm 24 varies the no-load position of the sleeve 17 and the forces set up in the rubber torsion bushing 18. This, of course, varies both the supporting characteristics of the torsion bushing and effects a change in the vertical positioning of the seat 2 at no-load dependent upon the no-load stresses in the rubber bushing.

As another important feature of the invention, Fig. 1 shows that the lever arm 24 is in engagement with a cam 25 suitably journalled on a portion of the bracket 16 adjacent the fingers 22. This cam 25, in the particular instance shown, is affixed to a gear 26 on a shaft 27 journalled on brackets 16 and carrying both the cam 25 and gear 26. The brackets 16 also have journalled thereon a control shaft 28 which has a worm 29 formed at the inner end portion thereof. The worm 29 is in constant engagement with the gear 26 and a control handle or knob 30 is provided on an exposed front end of the shaft 28 for convenient turning of the shaft 27 through a desired arc. Such action of the control shaft 28 rotates the cam 25 to change the position of the lever arm 24 and hence vary the torsional forces set up in the torsion rubber bushing 18. In the seat support 1 as shown herein, turning the lever arm 24 to raise it vertically will cause the seat 2 to be moved upwardly vertically and set up no-load stresses in the rubber torsion bushing so that the load support characteristics of the seat support 1 are changed and, in that instance, made stiffer.

It will be realized that the control cam and associated mechanisms could be positioned on the upper surface of the lever arm 24 to move such lever arm downwardly when the initial position of the seat support 1 under no-load conditions would be at its maximum vertical elevation. Then adjustment of the cam and associated control means would be used to move the seat support 1 downwardly under increased no-load torsion forces in the rubber torsion bushing 18 and thus effect a stiffening action on the seat support as it would be moved vertically downwardly under different no-load conditions.

It can be seen that other means such as lever-controlled ratchet and gear means could be used in place of the worm and gear means shown for controlling the position of the control cam 25, or a segment of the worm gear 26 can be secured as by welding to a portion of the lever arm 24 or other member fixedly carried by the inner sleeve 17 to change the position thereof directly.

Of course, any desired type of seat means can be positioned on and carried by the seat 2 of the seat support 1 of the invention.

It will be realized that any desired type of resilient cushioning means can be used for positioning the lower ends of the front and both ends of the rear support arms 10 and 4, respectively, but that the primary load support means in all events must comprise the rubber torsion bushing 18. Thus adjustment of such bushing controls the no-load position of the seat and the supporting characteristics thereof.

The support arms 10 are the primary support arms for the seat 2 and may be replaced by a single support arm if desired. The support arms 4 are the secondary support arms for the seat.

In view of the foregoing, it is contended that a novel, sturdy, vertically adjustable type of a seat support is provided by the invention and that the objects thereof have been achieved.

While one complete embodiment of the invention has been disclosed herein, it will be appreciated that modification of this particular embodiment of the invention may be resorted to without departing from the scope of the invention as defined in the appended claims.

I claim:

1. In a seat, a primary support arm, a pair of secondary support arms, a seat frame, means for pivotally anchoring corresponding lower ends of said support arms, means pivotally securing the upper ends of said secondary support arms to said seat frame, a torsion bushing having inner and outer sleeves, means adjustably securing one of said torsion bushing sleeves to said seat frame, means for securing the other of said torsion bushing sleeves to the upper end of said primary support arm, a lever arm secured to and extending substantially radially from said one of said sleeves, a cam on said seat frame and engaging said lever arm, and means for rotating said cam to change the position of said one sleeve.

2. A seat support comprising a seat member, a plurality of vertically movable support arms for said seat member, means for pivotally anchoring corresponding ends of said support arms, means for pivotally securing the other ends of said support arms to said seat member, said last-named means having a load support member including a rubber torsion bushing, and cam and lever means for changing the no-load forces set up in said rubber torsion bushing.

3. In a seat support, a seat member, a pivotal member for supporting said seat member, a torsion rubber spring secured between said seat member and said pivotal member for supporting said seat member, said torsion rubber spring having inner and outer sleeves with fingers extending from said inner sleeve, a lever arm engaging said fingers to form a unit with said inner sleeve, and means for varying the position of said lever arm to change the no-load position of said torsion rubber spring to adjust the support action thereof.

4. In a seat, primary support arm means, a pair of secondary support arms, a seat frame, means for pivotally anchoring corresponding lower ends of said support arms, means pivotally securing the upper ends of said secondary support arms to said seat frame, a torsion bushing having inner and outer sleeves, means adjustably securing the inner of said torsion bushing sleeves to said seat frame, and means for securing the outer of said torsion bushing sleeves to the upper end of said primary support arm means which thereby forms a unit with such, said adjustable securing means for said inner sleeve including cam and lever means connecting said inner torsion bushing sleeve to said seat frame for determining the position of and retaining such inner sleeve in a predetermined arcuate position with relation to said outer sleeve to vary the no-load position of said seat frame.

5. In a vehicle seat structure of the type including parallelogram guiding linkage effective to cause substantially rectilinear vertical movement of said seat, means providing yielding support for said seat in any position of elevation, said means comprising an annular torsional member, said member having a relatively rigid outer and inner peripheral portion, said outer peripheral portion being secured against rotation, an extension member secured to and extending substantially radially from the inner peripheral portion of said torsional member, cam means pivotally positioned on said seat and engaging said extension member to vary the arcuate position thereof, and means carried by said seat and engaging said cam means for adjusting and retaining the rotary position of the inner peripheral portion of said member relative to said seat by movement of said extension member whereby the support action and the height of said seat can be controlled.

References Cited in the file of this patent

UNITED STATES PATENTS

| | | |
|---|---|---|
| 2,008,209 | Herold | July 16, 1935 |
| 2,049,550 | Van Dresser | Aug. 4, 1936 |
| 2,630,854 | Neher | Mar. 10, 1953 |
| 2,667,209 | Gundersen | Jan. 26, 1954 |
| 2,682,295 | Hickman | June 29, 1954 |